Sept. 21, 1965 A. N. ANDREWS 3,207,849
TELEPHONE ALARM CONTACT PROTECTING DEVICE
Filed Oct. 19, 1959
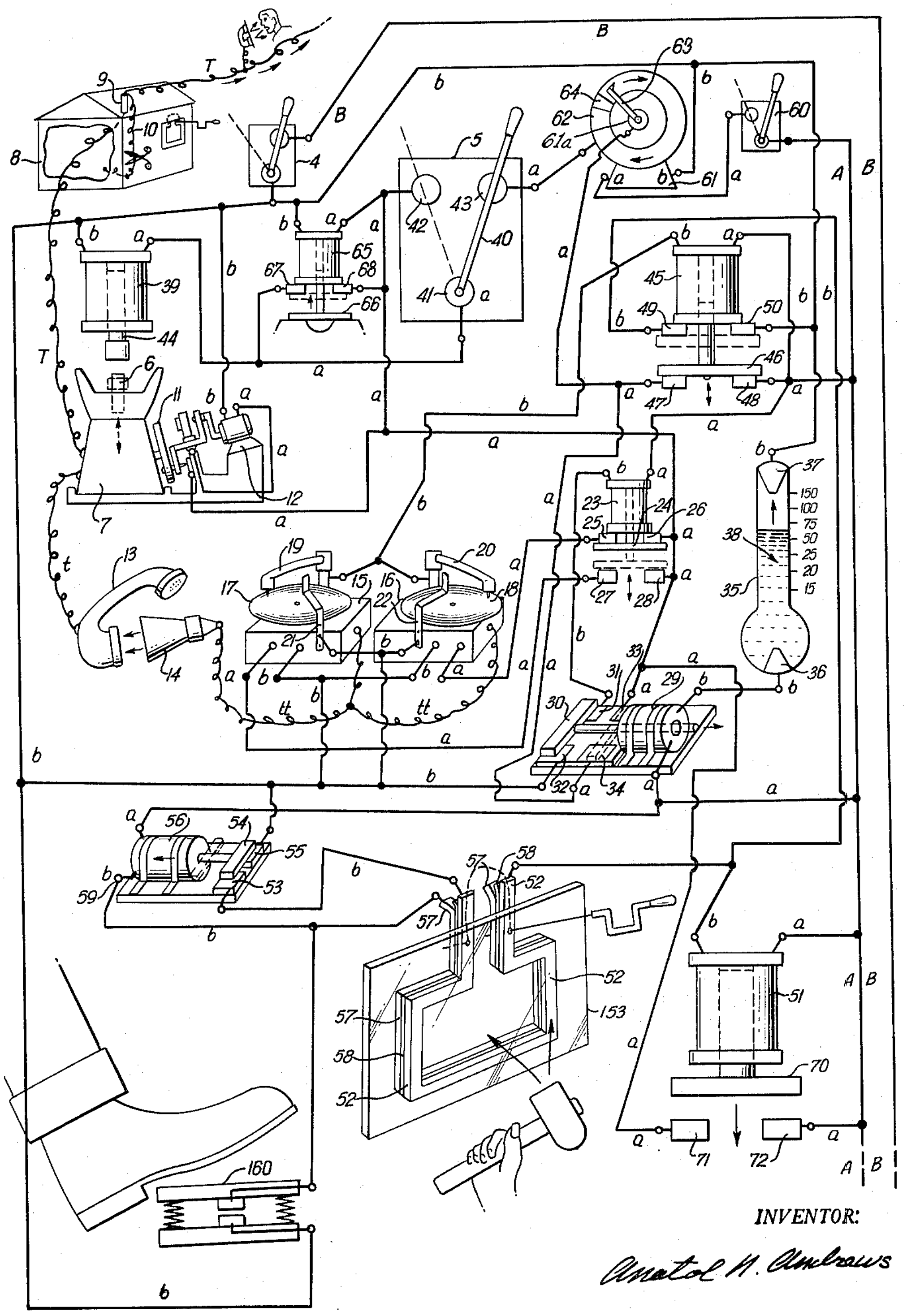
INVENTOR:
Anatol N. Andrews United States Patent Office 3,207,849

Patented Sept. 21, 1965

3,207,849

TELEPHONE ALARM CONTACT PROTECTING DEVICE

Anatol N. Andrews, 6033 Dauphin Ave., Los Angeles, Calif.

Filed Oct. 19, 1959, Ser. No. 847,214
3 Claims. (Cl. 179—5)

This invention relates to automatic telephone alarm systems, for instance, under my United States Patent No. 2,883,460, and more specifically to means for protecting their telephone alarm contacts in cases of burglarly, against a burglar's ingenuity, and is a telephone Alarm Contact Protecting Device for fouling a burglar's anticipated efforts to render such system inactive during burglary, and considers existing or possible restrictions related to the use of public telephone equipment in such systems.

Prior to this invention, an alarm device, using in a lawful manner a telephone apparatus and public telephone system for conveying alarm message to an outside telephone number, could be effectively fouled and rendered useless by an ingenious burglar who would employ an accomplice to make a telephone call from a remote public telephone booth to the telephone number on the aimed-to-be-burglarized premises just a few seconds before the burglar breaks into said premises, and said accomplice, after making such call, would keep said call active until he hears the telephone transmitter switch closed and the dial being dialed by the alarm device on the burglarized premises, and thereafter, while the prerecorded message therefrom is being transmitted to him instead of to the proper authorities, and until he either hears the telephone transmitter switch on the burglarized premises being automatically opened at the end of said transmission, or until his partner-burglar should have completed his job.

A very common, effective and easy, but law-violating, way to cope with such possible interference would be, of course, to close the subject telephone transmitter switch for the duration before and after the alarm, if any.

A mere closing of the telephone transmitter switch, without completing the operation for establishing contact with an outside telephone number, is not always objectionable, since, until such completion, the closing of the telephone transmitter switch merely keeps its private line reserved from all outside calls, which is generally tolerated since it affects only such private line and does not impair the outside operation of the public telephone system; as a matter of fact it is quite commonly and frequently practiced by many persons who do not wish to be disturbed for a certain length of time by telephone callers, especially during night, and it is done with apparent tolerance and knowledge of many telephone companies.

Yet there are some telephone companies who have installations flashing a signal to the company if a private line transmitter switch remains closed for a predetermined, and what they consider "extensive," length of time, for example, one or two hours. Upon receipt of such signal such telephone company considers the line being out of order, makes investigation and takes preventive steps which may result in prohibiting such further practice under penalty of having the line disconnected.

Nevertheless, to leave said transmitter switch closed after completion of the contact with outside telephone number, is considered by all telephone companies as abuse and direct interference with their public service and operation of the public telephone system, and thus is definitely prohibited, especially if it is officially known to be done deliberately.

Therefore, one of the most important objects of this invention is to provide in and for such alarm system an endurable means for blocking said possible interference with said alarm contact, said means comprising a device, where tolerated, for closing the telephone transmitter switch for the entire duration from the time it is closed by remote means by the departing authorized person until completion of actuated transmission of said alarm message, otherwise until said switch is opened by an authorized person, and co-operating means for automatically opening said switch continuously upon completion of said transmission of said alarm message; and, where necessitated, an additional device for periodically and automatically opening and closing within shorter-than-dialing time the otherwise continuously closed transmitter switch, at predetermined intervals shorter than otherwise ordinnarily would be noted by public telephone system installations for registering an excessively long closed transmitter switch, and for the duration from the time of said initial closing of said switch until the alarm is actuated, otherwise until said switch is opened by an authorized person, and, for neutralizing the latter device, means for automatically keeping closed and/or closing said switch continuously, immediately upon actuation of said alarm, if any, until the completion of alarm message transmission actuated by said alarm.

It is also an important object of this invention to make its reduction to practice simple, practical and susceptible of easy and inexpensive manufacture.

To illustrate how the afore and other objects of this invention can be practically achieved reference now is being made to the accompanying drawings.

In the drawings:

The drawings show a layout view of a telephone-type automatic alarm system using a dial type telephone apparatus and comprising features of this invention.

In reference to the drawings:

Wires A and B lead from a source of electric energy to said laid-out alarm system, and there they branch into various circuits *a* and *b* connecting via various relays various other components of said system for co-operating engagements and disengagements.

Manually operated switch 4 in the shown position closes and in the dotted position opens the circuit from said source of electric energy to said system.

Manually operated two way switch 5 governs the closing of the lift-type telephone transmitter switch 6 of the dial-type telephone apparatus 7 for a duration of time preceding and embracing the actuation of the alarm for periods of time when the subject premises are normally closed, or governs the subjecting of said switch 6 to becoming closed only upon the actuation and for the duration of said alarm for the periods of time when said system is desired to be used as a hold-up alarm system during the working hours when the subject premises are normally open.

When switch 4 is closed as shown and handle 40 of switch 5 is moved to the position indicated by dotted lines for bridging terminals 41 and 42 thereof the solenoid 39, which is vertically secured over telephone apparatus 7, remains de-actuated whereby the weight of its rod 44 will rest upon the telephone transmitter switch 6 thus keeping it open until solenoid 39 is actuated. But if the handle 40 of switch 5 is in the position shown, bridging terminals 41 and 43, solenoid 39 becomes actuated and pulls its said rod 44 upwardly from transmitter switch 6 thus closing the latter prior to alarm occurrence and for as long as the electric current is free to travel into said solenoid 39 from nearby wire *b*, connected with wire B, and to wire A via bridged terminals 41 and 43, and via conductive circular plate 62 of device 61 and conductive hand 63 conductively resting over said plate 62, and thereafter via terminals 47 and 48 when conductively bridged by plate 46, resting thereover.

However, whenever and while the flow of said current is broken said solenoid 39 will be immediately de-actuated dropping its rod 44 over transmiter switch 6 thus opening the latter for a corresponding length of time.

Therefore, when manually operated switch 60 is open, as shown, an electric clock-like motor 61A of device 61 is not actuated, and the aforesaid current from terminal 43 of switch 5 is free to travel undisturbed to terminal 47 via said plate 62 and hand 63 of device 61; but when said motor 61A of device 61 is actuated by manual closing of said switch 60 then said hand 63 starts rotating slowly clock-like and clockwise over said circular conductive plate 62 repeatedly towards and over a relatively short nonconductive spot 64 on said plate 62. Whenever and while the hand 63 travels over said nonconductive spot 64 said current will be temporaryily broken causing transmitter switch 6 to become open for the corresponding period.

The rotating speed of hand 63 and the width of spot 64 are dependent respectively upon the length of time tolerated by public telephone company for having their private telephone transmitter switch kept continuously closed, and upon the length of time required to dial a private telephone number. For instance, if such public telephone system has devices to detect that such transmitter switch has been closed "excessively" long after the switch has been kept closed continuously, for example, one hour, then the rotary speed of hand 63 should be set to complete turn in not over than one hour, which means that hand 63 would repeatedly reach the nonconductive spot 64 in less than one hour, and thus cause transmitter switch 6 to open temporarily prior to ever being detected as having been closed for an extended length of time.

If dialing of a private telephone number takes, for example, 7 seconds, then the width of spot 64 should be such as to allow rotating hand 63 to move over it in less than said 7 seconds, for instance, in three or four seconds, in just enough time to register the opening of the transmitter switch, and in less time than it would be possible for a would be interferer to complete dialing of the subject telephone number from an outside station.

If this is complied with, the chances for such interferer to succeed in blocking telephone alarm transmission by cutting into the telephone when the alarm-occurs, would be less, for instance, than for a sudden power failure at precisely the time of the alarm occurrence.

Thus, such means, like device 61, offer a practical solution for effectively blocking telephone interference where a public telephone system would persist on non-co-operation with efforts to prevent burglary.

When the aforesaid switch 4 is closed as shown the vertically secured solenoids 23 and 51 apparently become lastingly actuated.

Whenever the alarm system is actuated either by deactuation of solenoid 51 or by a relay responsive to an imminent fire condition, for instance, like relay 35, the vertically secured solenoid 65 becomes thereby immediately and lastingly actuated for the duration of the alarm induced activity in the alarm system, as can be easily observed by tracing the shown circuits. Actuation of solenoid 65 causes conductive plate 66 thereof to jump up from its resting platform and assume pressing position against conductive terminals 67 and 68, thus bridging the latter two continuously for the duration of said alarm activity. This will allow the electric current to bypass continuously to solenoid 39 and thereby keep the latter actuated continuously regardless of any position of hand 63 in device 61, therefore the transmitter switch 6 will then remain closed for the duration of the alarm message actuated transmission.

Telephone wire T from telephone apparatus 7 is carried from within house 8 directly into pipe 9 which is high above the roof of house 8, and continues therethrough to outside, high above the ground, to the regular power post. A dummy wire 10, appearing as the customary telephone outside wire, extends as if from the inside of house 8 in the usual for telephone wire manner, from a point close to the ground, and is carried, likewise in the manner usual for telephone wire, upwardly to the upper edge of said pipe 9 where it is made to appear as being so connected with the regular telephone cable T as to give a realistic view of being the apparently normal telephone wire normally extending from the lower point of the house and apparently continuing legitimately from near the upper end of pipe 9 to the regular telephone post. Evidently cutting such dummy wire 10 by the burglar will have no effect whatsoever upon the alarm system, yet will not arise any suspicion of abnormality.

Dial 11 of telephone apparatus 7 is automatically engageable by electrically motorized device 12, which may be, for instance, similar to the device for said purpose shown and described in reference to FIGURES 1 to 7 inclusive in my U.S. Patent No. 2,883,460.

Telephone wire *t* connects apparatus 7 with telephone receiver 13 secured opposite loud talker 14 which is connected by wire *tt* with a record or records reproducing device. For simplicity of illustration said reproducing device is shown here as the two separate electric phonographs 15 and 16 respectively, while, of course, they may be any available reproducing machine or machines reproducing several separate recordings, for instance, of the shown type, or a tape, or a wire recordings.

Here, likewise for the sake of said simplicity of illustration, the phonograph 15 has a common circular record 17 with pre-recorded fire alarm message, and phonograph 16 has likewise record 18 with pre-recorded burglar and/or hold-up alarm message. Phonograph 15 has its movable needle-handle 19 conductive and conductively connected with handle 20 of phonograph 16. Conductive "L" arms 21 and 22 are conductively bridged with each other and respectively secured to phonographs 15 and 16, as shown, whereby arm 21 would conductively contact handle 19 when the latter, moving towards the center of record 17, will reach a point where the recorded message thereon ends. Likewise conductive contact would be established between arm 22 and handle 20 when the latter is moved over record 18.

Actuated solenoid 23 holds conductive plate 24 upwardly, bridging terminals 25 and 26 and thus connecting terminal 26 with terminal of phonograph 16.

When solenoid 23 is de-actuated the plate 24 will drop by force of gravity over terminals 27 and 28, bridging the latter two and thus connecting terminal 28 with terminal of phonograph 15 and disconnecting terminal 26 from terminal of phonograph 16.

Horizontally secured solenoid 29 when not actuated allows conductive plate 30 to remain over conductive terminals 31 and 32 which are insulated from conductive terminals 33 and 34. When solenoid 29 is actuated it will pull horizontally, and thus permanently, plate 30 from terminals 31 and 32 towards and over terminals 33 and 34 thereby conductively connecting the latter two with each other.

Solenoid 29 is actuatable by a relay responsive to conditions predeterminably preceding an imminent fire. Such relay, for instance, may be a device actuatable by smoke, density of atmosphere, or by increase of temperature. In either of said conditions the sensitivity of an appropriate relay evidently may be predetermined and arranged to become actuated sufficiently in advance of a flared fire to provide time sufficient for actuated phonograph 15 to complete transmission of its recording 17. To illustrate as an example such predeterminable prearrangement of such relay responsive, for instance, to increase of temperature, the thermo-relay 35 may be provided.

Said relay 35 may comprise a mercury thermometer having conductive terminal 36 embodied therewithin at the bottom thereof, and conductive terminal 37 likewise embodied therewithin and secured at any predetermined point above normal level of mercury 38. For instance, if terminal 37 is secured at the shown point the conductive contact between said terminal 37 and terminal 36 will be established by expanding mercury 38 as soon as the temperature reaches 150°. This will immediately actuate solenoid 29, and even a momentary actuation thereof will instantaneously and permanently move plate 30 over terminals 33 and 34 thus actuating the transmission of the fire alarm in the shown system, i.e. it would close circuit to solenoid 39, if, prior thereto, the conductive arm 40 of switch 5 was manually set to bridge terminals 41 and 42 thereof; however, if prior thereto said arm 40 was manually set to bridge terminals 41 and 43 of said switch 5 (as shown), then said solenoid 39 would have been already priorly actuated, and when solenoid 39 is actuated it lifts, as aforesaid, the weight of its rod 44 from the lift-type telephone transmitter switch 6 thus closing the latter; it would also close circuit to the dialing device 12 which, after a predetermined time, would turn and release dial 11 of telephone apparatus 7 thus establishing contact with an outside telephone number, for instance, substantially as described in my U.S. Patent No. 2,883,460; it would also de-actuate solenoid 23 causing plate 24 to drop down over terminals 27 and 28 thus opening circuit to phonograph 16 and closing circuit to phonograph 15, the latter thus will start and continue delivering the pre-recorded fire-alarm message to telephone receiver 13 via loud talker 14.

At the end of said message, handle 19 would contact arm 21, as has been priorly explained, which would actuate the vertically secured solenoid 45 causing conductive plate 46 to jump upwardly from the shown position to the dotted position in which it will bridge conductively terminals 49 and 50. This evidently will de-actuate solenoid 39 and cause its rod 44 to drop down by gravity over telephone transmitter switch 6 thus opening the latter; it would also open the circuits to phonograph 15 and dial-device 12, though, the latter two, phonograph 15 and device 12, of course, may have their customary built-in individual shut-off switches co-ordinated to take effect automatically at the completion of their respective functions.

Until thermo-relay switch 35 is so affected by the aforesaid temperature rise the horizontal solenoid 29 will not become actuated, and thus the vertical solenoid 23 will remain actuated, whereby the would-be electric current is channelled to phonograph 16 with its burglar and/or hold-up alarm record 18 in readiness for transmission.

The actuation of phonograph 16 is dependent upon de-actuation of vertically secured solenoid 51. The actuating current to solenoid 51 passes through conductive tape circuit 52 on the inside glass face of window 153, and travels via terminals 53 and 55 when they are horizontally bridged, as shown, by conductive plate 54, the latter being subject to horizontal, and thus permanent, removal from said terminals 53 and 55 by even momentary actuation of horizontally secured solenoid 56 and its movable rod thereby secured with said plate 54.

Conductive tape circuit 57 is of substantially the same size and shape as the tape circuit 52 and is secured therebehind, thereover and is invisible therefore from outside, and is indistinguishable as a separate circuit from circuit 52, though in fact it is separated therefrom by nonconductive tape (or paint) 58 therebetween and substantially thinner than the conductive tapes 52 and 57. Being thinner it will not cave-in sufficiently to insulate the edges of a small hole in tape 57 if such hole is drilled from outside through the glass, the tape 52, said tape 58 and, inevitably, into and through tape 57.

Conductive tape 57 is connected with terminal 59 of solenoid 56. The other terminal of the latter is connected directly with wire A.

Thus if a burglar simply breaks the glass of window 153 the tape circuit 52 will become broken de-actuating solenoid 51. On the other hand, if the burglar attempts to short-circuit tape 52 by drilling small holes through the glass into the parting sections of tape 52 for connecting said sections with conductive wire by forcing the ends of the latter through said holes respectively (as indicated), his drill or said wire so inserted will conductively connect tape circuit 52 with tape circuit 57 through said thinner insulation of nonconductive tape 58. This will evidently actuate solenoid 56 and pull horizontally, and thus permanently, plate 54 from terminals 53 and 55 which apparently will de-actuate solenoid 51. Therefore, regardless how or when the burglar breaks or cuts any portion of the glass in window 153 to provide entry hole for himself or his hand, it would lastingly de-actuate solenoid 51.

The latter will become also lastingly de-actuated if and when even a momentary pressure is applied on the contact switch 160, which may be engaged by foot as indicated, for instance, during a day-time hold-up. Once said pressure is applied against switch 160, it will make no difference if immediately thereafter such pressure is permanently removed therefrom, or is continued, or is repeated, because the first, even momentary, pressure thereagainst will apparently send current into solenoid 56 actuating the latter which will cause plate 54 to be instantaneously pulled horizontally and thus permanently towards said solenoid 56 and away from terminals 53 and 55 thus permanently breaking contact therebetween regardless of what may be done thereafter, or by whom, in relation to said switch 160.

De-actuation of solenoid 51 by either of the aforesaid means or conditions will cause its conductive plate 70 to drop by force of gravity lastingly over conductive terminals 71 and 72 bridging the latter two and thus closing circuit to phonograph 16, the dialing device 12, the solenoid 65 and solenoid 39, if the latter was not already actuated prior thereto by appropriate setting of switch 5, or actuating said solenoid 39 continuously by shortcircuiting, via terminals 68 and 67, the effect of device 61 if the motor of the latter was priorly actuated as previously described.

When thus actuated, phonograph 16 will complete transmission of its intruder alarm message via record 18, the handle 20 thereof will come in contact with arm 22 which will send current into solenoid 45 actuating the latter and thus causing its conductive plate 46 to move upwardly breaking contact between terminals 47 and 48 and establishing contact between terminals 49 and 50 whereby solenoid 51 will become again and lastingly actuated thus pulling its plate 70 from terminals 71 and 72. Thereby evidently the entire alarm circuit and the telephone transmitter switch 6 will become lastingly open until re-set for further engagements.

For a telephone alarm structure equipped with the exemplified device of this invention as herein illustrated will operate only with a particular type of telephone system, i.e. either in conjunction wtih a telephone system which, for the telephone connection, allows unrestricted closing of the telephone transmitter switch prior to operating the telephone digit mechanism; or a telephone system which therefore allows such closing for a predetermined prolonged period.

In view of said pointed limitations it should become apparent to any person skilled in the art that said device is not compatible for said structure in conjunction with a telephone system which, for the telephone connection, may automatically require the operating of the telephone digit mechanism within a substantially short period after the telephone transmitter switch has been closed, but would be, of course, compatible in conjunction with the latter system for a telephone alarm structure equipped with an independent and separate from this invention means responsive to the alarm triggering occurrence for thereupon automatically opening the prior thereto closed telephone transmitter switch and then closing it again.

While the reduction to practice of the principles of this invention has been herein taught, demonstrated, shown and described in several various forms, it is understood, of course, that the patent protection for this invention is not restricted to said forms, but is limited only by the scope of the accompanying claims.

I claim as my invention:

1. For an electrically operated alarm structure with triggering and operating components associated with a source of electric power and actuated by an alarm triggering occurrence and having means for operating automatically a telephone apparatus and including an electric means responsive to the alarm triggering occurrence for closing the telephone transmitter switch, and in conjunction with a telephone system allowing the closing of the subscriber's telephone transmitter switch for a predetermined prolonged period prior to operating the telephone digit mechanism for reaching an outside telephone number, an electrically operated device for preventing the engagement from outside of the subscriber's telephone line prior to the alarm triggering occurrence and comprising a conductive means with a plurality of electric terminals removed from each other for electric circuit connections; an electric circuit means for temporarily connecting one of said terminals with the source of electric power; a dormantly open electric circuit associated with another of said terminals; a solenoid including two terminals; a dormantly open electric circuit means for connecting the source of electric power, via the alarm structure triggering components, with one terminal of the solenoid; an electric circuit connecting the other terminal of the solenoid with the source of electric power; an electric circuit switching means connected with the electric means of the alarm structure and movably extended for connecting the latter means alternately with the dormantly open electric circuit means and the dormantly open electric circuit, respectively, the first thereof for disconnecting electrically the alarm structure from the device, and the second thereof for connecting electrically the alarm structure with the device and for actuating the electric means of the alarm structure for closing the telephone transmitter switch prior to the alarm triggering occurrence; an electrically motorized repeater-timer-and-switch means for repeated alternate connections and disconnections of the conductive means with the source of electric power, and associated with the electric means of the alarm structure when the electric circuit therewith is closed, for automatically keeping, when actuated, the telephone transmitter switch closed for periodically broken and successively repeated extended lengths of time respectively shorter than the predetermined prolonged period allowed by the telephone system, and for periodically opening the telephone transmitter switch within the breaks between said extended lengths of time and for respectively shorter lengths of time than required for actuating from outside the telephone contact with the subscriber's telephone; a short-circuit means for bypassing the device in connecting the electric means of the alarm structure with the source of electric power upon the alarm triggering occurrence; means for keeping the short-circuit means open prior thereto when the electric circuit switching means is connected with the electric circuit of the device; a solenoid means for closing, when actuated, the short-circuit means; electric circuit means connecting the solenoid means with the source of electric power via the alarm structure triggering and operating components for actuating the solenoid means by and at the alarm triggering occurrence.

2. For an electrically operated alarm structure with triggering and operating components associated with a source of electric power and actuated by an alarm triggering occurrence and having means for operating automatically a telephone apparatus and including an electric means responsive to the alarm triggering occurrence for closing the telephone transmitter switch, and in conjunction with a telephone system allowing the closing of the subscriber's telephone transmitter switch for an unrestricted period prior to operating the telephone digit mechanism for reaching an outside telephone number, an electrically operated device for preventing the engagement from outside of the subscriber's telephone line prior to the alarm triggering occurrence and comprising a conductive means with a plurality of electric terminals removed from each other for electric circuit connections; an electric circuit means for connecting one of said terminals with the source of electric power; a dormantly open electric circuit associated with another of said terminals; a dormantly open electric circuit means for connecting it with the source of electric power via the alarm structure triggering components; an electric circuit switching means connected with the electric means of the alarm structure and movably extending for connecting the latter means alternately with the dormantly open electric circuit means and the dormantly open electric circuit, respectively, the first thereof for disconnecting electrically the alarm structure from the device, and the second thereof for connecting electrically the alarm structure with the device for actuating the electric means of the alarm structure for closing and keeping closed the telephone transmitter switch prior to the alarm triggering occurrence.

3. For an electrically operated alarm structure with triggering and operating components associated with a source of electric power and actuated by an alarm triggering occurrence and having means for then operating automatically a telephone apparatus and including an electric means responsive to the alarm triggering occurrence for thereupon closing the prior thereto open telephone transmitter switch, and likewise an alarm structure having an electric means likewise responsive for thereupon opening and shortly thereafter closing the prior thereto closed telephone transmitter switch, and in conjunction with, respectively, a telephone system allowing for the telephone connection and the closing of the subscriber's telephone transmitter switch for an unrestricted period prior to operating the telephone digit mechanism, and a telephone system automatically requiring for the telephone connection, the operation of the telephone digit mechanism within a short period after the telephone transmitter switch has been closed, an electrically operated device for preventing the engagement from outside of the subscriber's telephone line prior to the alarm triggering occurrence and comprising a conductive means with a plurality of electric terminals removed from each other for electric circuit connections; an electric circuit means for connecting one of said terminals with the source of electric power; a dormantly open electric circuit associated with another of said terminals; a solenoid including two terminals; a dormantly open electric circuit means for connecting the source of electric power, via the alarm structure triggering and operating components, with one terminal of the solenoid; an electric circuit connecting the other terminal of the solenoid with the source of electric power; an electric circuit switching means connected with the electric means of the alarm structure and movably extended for connecting the latter means alternately with the dormantly open electric circuit means and the dormantly open electric circuit, respectively, the first thereof for disconnecting electrically the alarm structure from the device, and the second thereof for connecting electrically the alarm structure with the device for actuating the electric means of the alarm structure for closing the telephone transmitter switch prior to the alarm triggering occurrence; a short-circuit means for bypassing the device in connecting the electric means of the alarm structure with the source of electric power upon the alarm triggering occurrence; means for keeping the short-circuit means open prior thereto when the electric circuit switching means is connected with the dormantly open electric circuit of the device; a solenoid means for closing, when actuated, the short-circuit means; an electric circuit means connecting the solenoid means with the source of electric power via the alarm structure triggering and operating components for actuating the solenoid means by and upon the alarm triggering occurrence.

References Cited by the Examiner

UNITED STATES PATENTS

| | | | |
|---|---|---|---|
| 1,093,801 | 4/14 | Phelps | 340—277 |
| 1,217,175 | 2/17 | Hilley | 340—276 |
| 1,531,629 | 3/25 | Squire | 179—1 |
| 1,658,848 | 2/28 | Kalikow | 340—277 |
| 1,965,946 | 7/34 | Pincus et al. | 340—276 |
| 2,332,775 | 10/43 | Bell | 340—227 |
| 2,371,051 | 3/45 | Kendig | 179—5.1 |
| 2,498,613 | 2/50 | Talbot | 179—5.1 |
| 2,555,714 | 6/51 | Talbot | 179—5.1 |
| 2,768,239 | 10/56 | Foster et al. | 179—5.1 |
| 2,810,902 | 10/57 | Crossley | 340—228 |
| 2,905,762 | 9/59 | Rettie et al. | 179—5.1 |

DAVID G. REDINBAUGH, *Primary Examiner.*

L. MILLER ANDRUS, *Examiner.*